(12) United States Patent
Kawamura et al.

(10) Patent No.: US 9,112,772 B2
(45) Date of Patent: Aug. 18, 2015

(54) OLT AND FRAME TRANSFER CONTROL METHOD

(75) Inventors: Tomoaki Kawamura, Tokyo (JP); Shoko Ohteru, Tokyo (JP); Ritsu Kusaba, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/118,889

(22) PCT Filed: Jun. 28, 2012

(86) PCT No.: PCT/JP2012/066551
§ 371 (c)(1),
(2), (4) Date: Nov. 19, 2013

(87) PCT Pub. No.: WO2013/002333
PCT Pub. Date: Jan. 3, 2013

(65) Prior Publication Data
US 2014/0112659 A1   Apr. 24, 2014

(30) Foreign Application Priority Data
Jun. 29, 2011  (JP) .................................. 2011-144061

(51) Int. Cl.
| H04L 12/26 | (2006.01) |
| H04B 10/08 | (2006.01) |
| H04B 10/25 | (2013.01) |
| H04Q 11/00 | (2006.01) |
| H04B 10/077 | (2013.01) |

(52) U.S. Cl.
CPC .......... *H04L 43/022* (2013.01); *H04B 10/0773* (2013.01); *H04Q 11/0067* (2013.01); *H04Q 11/0071* (2013.01)

(58) Field of Classification Search
CPC ...................... H04Q 11/0067; H04Q 11/0071
USPC ........................................... 398/33, 30, 25, 9
See application file for complete search history.

(56) References Cited

U.S. PATENT DOCUMENTS

| 2004/0004943 A1* | 1/2004 | Kim et al. ..................... 370/310 |
| 2005/0143131 A1* | 6/2005 | Gish et al. .................... 455/561 |

(Continued)

FOREIGN PATENT DOCUMENTS

| JP | 2007-074553 A | 3/2007 |
| JP | 2009-260668 A | 11/2009 |
| JP | 2010-050857 A | 3/2010 |
| JP | 2010-252062 A | 11/2010 |
| JP | 2011-087023 A | 4/2011 |

OTHER PUBLICATIONS

Shiba [JP 2007-074553, english translation].*

*Primary Examiner* — Oommen Jacob
(74) *Attorney, Agent, or Firm* — Blakely Sokoloff Taylor & Zafman

(57) ABSTRACT

In a control frame processing unit (14), the number of control frames from a frame demultiplexing unit (13) is counted for each of LLIDs given to the control frames. If the number of frames during a predetermined count period is equal to or smaller than a preset threshold, some or all of the control frames are written in a storage device (30) as processing data. When the number of frames has exceeded the threshold, writing data of the control frames having the LLID in the storage device is stopped. Hence, even when the number of control frames from ONUs increases, software processing can be executed properly.

4 Claims, 17 Drawing Sheets

(56) References Cited

U.S. PATENT DOCUMENTS

| | | | |
|---|---|---|---|
| 2005/0220096 A1* | 10/2005 | Friskney et al. | 370/389 |
| 2010/0067913 A1* | 3/2010 | Niibe et al. | 398/98 |
| 2011/0085799 A1* | 4/2011 | Mizutani | 398/37 |
| 2014/0105602 A1* | 4/2014 | Kawamura et al. | 398/66 |
| 2014/0112659 A1* | 4/2014 | Kawamura et al. | 398/33 |

* cited by examiner

FIG.4

| ENTRY ADDRESS | ENTRY ENABLE/DISABLE | PRESENCE/ABSENCE OF ADDITIONAL CONDITIONS | INPUT DATA POSITION | BIT POSITION | DETERMINATION COMPARISON DATA | TRANSFER DESTINATION | FRAME TYPE ID |
|---|---|---|---|---|---|---|---|
| 0 | ENABLE | ABSENT | 2 | FF-FF-00-00-00-00 | 88-08-00-00-00-00 | 1 | 0 |
| 1 | ENABLE | PRESENT | 0 | FF-FF-FF-FF-FF-FF | 01-80-C2-00-00-02 | 2 | 2 |
| 2 | ENABLE | ABSENT | 2 | FF-FF-00-00-00-00 | 88-09-00-00-00-00 | 2 | 2 |
| 3 | DISABLE | ABSENT | | | | | |

FIG.7

| ENTRY ADDRESS | ENTRY ENABLE/DISABLE | PRESENCE/ABSENCE OF ADDITIONAL CONDITIONS | INPUT DATA POSITION | BIT POSITION | DETERMINATION COMPARISON DATA | TRANSFER DESTINATION | FRAME TYPE ID |
|---|---|---|---|---|---|---|---|
| 0 | ENABLE | ABSENT | 2 | FF-FF-00-00-00-00 | 88-09-00-00-00-00 | 2 | 0 |
| 1 | ENABLE | PRESENT | 2 | FF-FF-00-00-00-00 | 08-00-00-00-00-00 | 2 | 2 |
| 2 | ENABLE | PRESENT | 3 | F0-00-00-00-00-00 | 40-00-00-00-00-00 | 2 | 2 |
| 3 | ENABLE | ABSENT | 4 | 00-00-00-FF-00-00 | 00-00-00-02-00-00 | 2 | 2 |
| 4 | ENABLE | PRESENT | 2 | FF-FF-00-00-00-00 | 86-DD-00-00-00-00 | 2 | 2 |
| 5 | ENABLE | PRESENT | 3 | F0-00-00-00-00-00 | 60-00-00-00-00-00 | 2 | 2 |
| 6 | ENABLE | PRESENT | 4 | FF-00-00-00-00-00 | 00-00-00-00-00-00 | 2 | 2 |
| 7 | ENABLE | ABSENT | 9 | 00-00-00-00-FF-00 | 00-00-00-00-3A-00 | 2 | 2 |
| 8 | ENABLE | PRESENT | 2 | FF-FF-00-00-00-00 | 86-DD-00-00-00-00 | 2 | 2 |
| 9 | ENABLE | PRESENT | 3 | F0-00-00-00-00-00 | 60-00-00-00-00-00 | 2 | 2 |
| 10 | ENABLE | ABSENT | 4 | FF-00-00-00-00-00 | 3A-00-00-00-00-00 | 2 | 2 |

FIG.15

| ENTRY ADDRESS | ENTRY ENABLE/DISABLE | PRESENCE/ABSENCE OF ADDITIONAL CONDITIONS | INPUT DATA POSITION | BIT POSITION | DETERMINATION COMPARISON DATA | TRANSFER DESTINATION |
|---|---|---|---|---|---|---|
| 0 | ENABLE | ABSENT | 2 | FF-FF-00-00-00-00 | 88-08-00-00-00-00 | 1 |
| 1 | ENABLE | PRESENT | 0 | FF-FF-FF-FF-FF-FF | 01-80-C2-00-00-02 | 2 |
| 2 | ENABLE | ABSENT | 2 | FF-FF-00-00-00-00 | 88-09-00-00-00-00 | 2 |
| 3 | DISABLE | ABSENT | | | | |

OLT AND FRAME TRANSFER CONTROL METHOD

TECHNICAL FIELD

The present invention relates to an optical communication technology and, more particularly, to a frame transfer control technique in an OLT (Optical Line Terminal) that connects a PON system to a carrier network (service network),

BACKGROUND ART

A conventional PON system and an OLT used as a station apparatus in the PON system will be described with reference to FIGS. 10 and 11.

When connecting a plurality of ONUs to a carrier network (service network), an optical splitter is arranged in the PON section, and the ONUs are connected to one OLT, as shown in FIG. 10.

In the conventional PON system, an OLT as shown in FIG. 11 is used. Referring to FIG. 11, a first transmission/reception circuit 52 is a circuit that transmits/receives a frame to/from an ONU via the PON connected to a PON port 51.

A second transmission/reception circuit 58 is a circuit that serves as an interface to a carrier network NW connected via an SNI port 59.

A frame demultiplexing unit 53 is a processing unit that transmits, out of upstream frames input from the first transmission/reception circuit 52, a frame (control frame used to control the PON) for the OLT to a control frame processing unit 54 and transmits the remaining frames to a frame transfer processing unit 60.

A frame multiplexing unit 56 is a processing unit that time-divisionally multiplexes a downstream frame from the frame transfer processing unit 60 and a control frame from the control frame processing unit 54 and transmits them to the first transmission/reception circuit 52.

The frame transfer processing unit 60 is a processing unit that transfers frames received from both the frame demultiplexing unit 53 and the second transmission/reception circuit 58 based on their destination MAC addresses and the like.

The control frame processing unit 54 is a processing unit that performs processes concerning PON control such as a discovery process for automatically assigning an LLID to each ONU and arbitration of an upstream signal (signal from an ONU to the OLT) and processing of transferring PON-IF port information such as the LLID of each ONU to a band assignment processing unit 55.

The band assignment processing unit 55 is a processing unit that performs assignment of a band (transmission start time and transmission data amount) to an ONU or management of PON-IF port information transferred from the control frame processing unit 54 in response to a request from the control frame processing unit 54.

Data are exchanged using a frame having the arrangement as shown in FIG. 12 in the PON section of the PON system, that is, the section between an ONU n and the OLT.

Referring to FIG. 12, the preamble is formed by embedding an LLID in the preamble of Ethernet®.

The LLID (Logical Link ID) is an identifier provided in a one-to-one correspondence with each ONU.

The LLID is decided by the OLT when registering an ONU (placing an ONU under the OLT). The OLT manages the LLIDs without repetition among the ONUs under it.

A VLAN tag is a tag including VLAN information. The tag may be absent, or a plurality of tags may be added. The VLAN tag includes TPID and TCI.

TPID (Tag Protocol ID) is an Ether Type value representing that a VLAN tag follows. The value is normally 0x8100.

TCI (Tag Control Information) is VLAN tag information. The TCI includes PCP, CFI, and VID.

PCP (Priority Code Point) is the priority of the frame.

CFI (Canonical Format Indicator) is a value representing whether the MAC address in the MAC header complies with the standard format.

VID or VLAN ID (VLAN Identifier) is a value that designates a VLAN to which the frame belongs.

Type is an Ether Type value representing the type of the host protocol. In some cases, notation "Type/Length" or the like is used because the area is also used for a Length value.

RELATED ART LITERATURE

Patent Literature

Patent Literature 1: Japanese Patent Laid-Open No. 2009-260668

DISCLOSURE OF INVENTION

Problem to be Solved by the Invention

In an OLT 50 used in the conventional PON system, when the frame demultiplexing unit 53 determines whether an input frame is addressed to the OLT, the MAC address, the Type/Length value, and the like can be used.

For example, for an MPCP (Multi-Point Control Protocol) frame that is a PON control frame defined by IEEE802.3, when the Type/Length value is "8808" in hexadecimal notation, the frame can be determined as addressed to the OLT.

For a monitor control frame called an OAM (Operations, Administration, and Maintenance), when the destination MAC address is "01-80-C2-00-00-02" in hexadecimal notation, and the Type/Length value is "8809" in hexadecimal notation, the frame can be determined as addressed to the OLT.

Software processing such as OAM processing is necessary, although patent literature 1 described above does not explicitly mention transferring frames for the OLT to a storage device for software processing. To cause a CPU provided outside or inside the OLT to performs software processing such as OAM processing, it is necessary to transfer some (or all) of frames for the OLT to the storage device.

Referring to FIG. 13, a storage device 70 for software processing is added, as compared to the arrangement shown in FIG. 11 described above. Some (or all) of frames for the OLT are written from the control frame processing unit 54 in the storage device 70.

In the conventional OLT 50, the frame demultiplexing unit 53 that demultiplexes an upstream frame transmitted from an ONU to the control frame processing unit 54 and the frame transfer processing unit 60 has an arrangement as shown in FIG. 14.

A frame determination unit 53A compares the destination MAC address and the like of the input upstream frame with a determination condition registered in a frame determination table 53B, thereby determining the transfer destination of the upstream frame.

The presence/absence of additional conditions, input data position, bit position, determination comparison data, transfer destination, and entry enable/disable are registered in the frame determination table 53B shown in FIG. 15 in correspondence with each entry.

Out of these data, the presence/absence of additional conditions is information representing whether to perform determination in combination with the next entry. The input data position is information that designates the MAC address or the like to be used for determination. In this example, "0" designates the destination MAC address; "1", the transmission source MAC address; "2", 6-byte data immediately after the transmission source MAC address; and "3", 6-byte data immediately after "2".

The bit position is mask information that further designates bits to be used for determination out of the MAC address or the like designated by the input data position. The determination comparison data is data to be compared with the bits designated by the bit position. The transfer destination is information representing the transfer destination of the input frame based on the comparison result. In this example, "0" indicates the frame transfer processing unit 60; "1", a frame processing circuit 54B; and "2", the storage device 70. Entry enable/disable is information representing the enable/disable of the entry.

Parallel to the upstream frame transfer destination determination processing of the frame determination unit 53A, a latency absorption unit 53C gives a delay corresponding to the time needed for the processing of the frame determination unit 53A to the upstream frame input from the first transmission/reception circuit 52, and outputs the upstream frame to a data giving unit 53D.

The data giving unit 53D gives the transfer destination notified by the frame determination unit 53A to the preamble of the upstream frame from the latency absorption unit 53C, and outputs the upstream frame to an output destination selection unit 53E.

An example of the arrangement of the upstream frame shown in FIG. 16 is different from the frame shown in FIG. 12 described above in that the transfer destination is inserted into the preamble.

The output destination selection unit 53E outputs the upstream frame to the frame transfer processing unit 60 or the control frame processing unit 54 based on the transfer destination given to the preamble of the upstream frame from the data giving unit 53D. More specifically, in this example, when the transfer destination is "0", the upstream frame is output to the frame transfer processing unit 60. When the transfer destination is "1" or "2", the upstream frame is output to the control frame processing unit 54.

In the OLT 50, the control frame processing unit 54 that separates a control frame transmitted from an ONU to the frame processing circuit 54B and the storage device 70 has an arrangement as shown in FIG. 17.

A transfer destination selection unit 54A transfers the upstream frame from the frame demultiplexing unit 53 to the frame processing circuit 54B or the storage device 70 based on the transfer destination given to the preamble of the upstream frame.

The frame processing circuit 54B performs, based on the upstream frame from the transfer destination selection unit 54A, processes concerning PON control such as a discovery process for automatically assigning an LLID to each ONU and arbitration of an upstream signal (signal from an ONU to the OLT) and processing of transferring PON-IF port information such as the LLID of each ONU to the band assignment processing unit 55.

A data write unit 54C performs processing of writing some (or all) of the upstream frames from the transfer destination selection unit 54A in the storage device 70.

In the conventional OLT, some (or all) of the frames addressed to the OLT are thus transferred to the storage device 70 for software processing to perform software processing such as OAM processing.

On the other hand, although the present IEEE802.3 (ANNEX43B.2 and 57.3.2.2) defines that the number of OAM frames to be transmitted needs to be 10 frames/s or less, relaxing the restriction has been examined.

Additionally, in the OLT, an IGMP (Internet Group Management Protocol) frame or an MLD (Multicast Listener Discovery) frame for multicast control is also transferred as a control frame other than the OAM frame.

Restricting the number of such frames to be transmitted is also considered.

Hence, in the PON system in which a plurality of ONUs are connected to an OLT, as shown in FIG. 10 described above, the OLT needs to receive a control frame such as an OAM frame, an IGMP frame, or an MLD frame from the ONUs. When the number of control frames increases, the data write amount in the storage device 70 increases. This increases the processing load on the software of the CPU provided outside or inside the OLT to process the data in the storage device 70. For this reason, the processing delays, and as a result, the software processing cannot be executed properly.

The present invention has been made to solve the above-described problems, and has as its object to provide a frame transfer control technique capable of properly executing software processing even when the number of control frames from ONUs increases.

Means of Solution to the Problem

In order to achieve the above-described object, according to the present invention, there is provided an OLT that is connected to a plurality of ONUs via a PON and connected to a host apparatus via an SNI (Service Node Interface) and mutually transfers a frame to be exchanged between the ONUs and the host apparatus, comprising a storage device that stores processing data as a target of software processing, a frame demultiplexing unit that demultiplexes and outputs one of a control frame to be used in the PON and a control frame to be used in the software processing from an upstream frame received from the ONU via the PON, and a control frame processing unit that counts the number of control frames from the frame demultiplexing unit for each of individual LLIDs (Logical Link IDs) of the ONUs given to the control frames, if the number of frames during a predetermined count period is not more than a preset threshold, writes data formed from some or all of the control frames having the LLID in the storage device as the processing data, and when the number of frames has exceeded the threshold, stops writing data of the control frames having the LLID in the storage device.

According to the present invention, there is also provided a frame transfer control method used in an OLT that is connected to a plurality of ONUs via a PON and connected to a host apparatus via an SNI (Service Node Interface) and mutually transfers a frame to be exchanged between the ONUs and the host apparatus, the method comprising the step of storing processing data as a target of software processing in a storage device, the frame demultiplexing step of demultiplexing and outputting one of a control frame to be used in the PON and a control frame to be used in the software processing from an upstream frame received from the ONU via the PON, and the control frame processing step of counting the number of control frames from the frame demultiplexing step for each of individual LLIDs (Logical Link IDs) of the ONUs given to the control frames, if the number of frames during a predetermined count period is not more than a preset threshold, writing data formed from some or all of the control frames having the LLID in the storage device as the processing data, and when the number of frames has exceeded the threshold, stopping writing data of the control frames having the LLID in the storage device.

Effect of the Invention

According to the present invention, it is possible to suppress the data write amount when writing, in a storage device, data formed from some or all of control frames input from the frame demultiplexing unit. This can avoid a situation in which processing load on software for processing data in the storage device increases, and processing delays because of an increase in the amount of data written in the storage device. For this reason, even when the number of control frames from the ONUs increases, software processing can be executed properly.

BRIEF DESCRIPTION OF DRAWINGS

FIG. 4 is a view showing an example of the arrangement of a frame determination table according to the first embodiment;

FIG. 7 is a view showing an example of the arrangement of a frame determination table according to the second embodiment;

FIG. 15 is a view showing an example of the arrangement of a conventional frame determination table;

BEST MODE FOR CARRYING OUT THE INVENTION

Embodiments of the present invention will now be described with reference to the accompanying drawings.

First Embodiment

A PON system 100 according to the first embodiment of the present invention will be described first with reference to FIG. 1.

Figure 1:
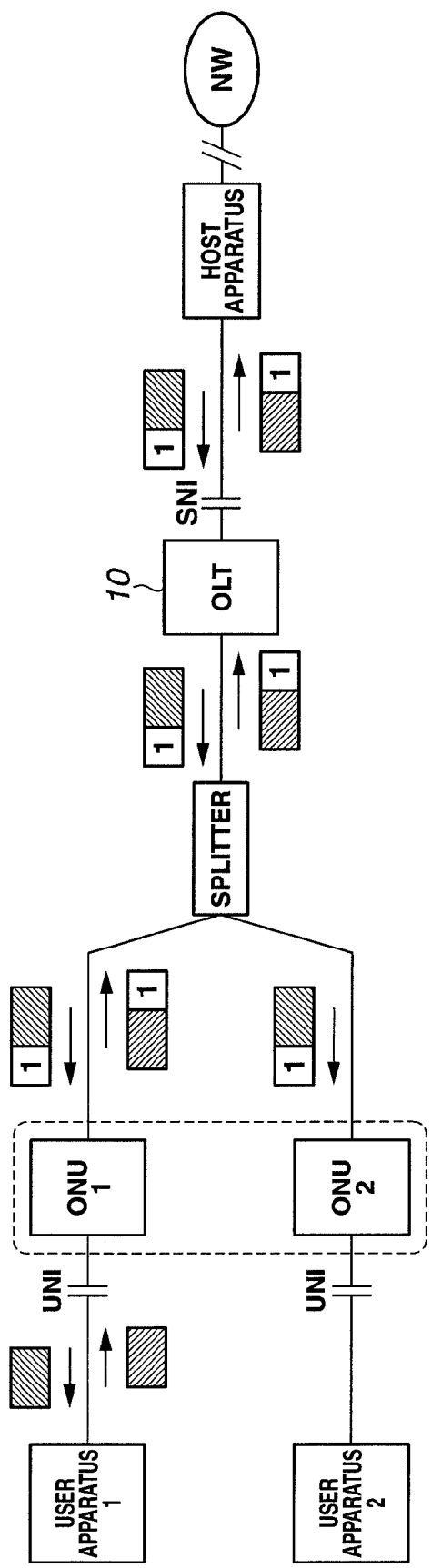
FIG. 1 is a block diagram showing the arrangement of a PON system according to the first embodiment.

As shown in FIG. 1, in the PON system 100, ONUs n (n=1 to 3) are connected to user apparatuses n via UNIs (User Network Interfaces).

The ONUs are commonly connected to one optical splitter via an optical transmission channel. The optical splitter is connected to one OLT 10 via the optical transmission channel.

A host apparatus is connected, via an SNI, to an SNI port provided on the SNI side of the OLT 10. A carrier-side network (service network) NW is connected to the host apparatus.

OLT

The arrangement of the OLT 10 according to this embodiment will be described next with reference to FIG. 2.

The arrangement of the OLT 10 according to this embodiment is different from that of the conventional OLT in that a control frame processing unit 14 has a function of, when writing some or all of upstream frames from a frame demultiplexing unit 13 in a storage device 30, limiting the write frequency to the storage device 30 in correspondence with each LLID of the upstream frames.

Figure 2:
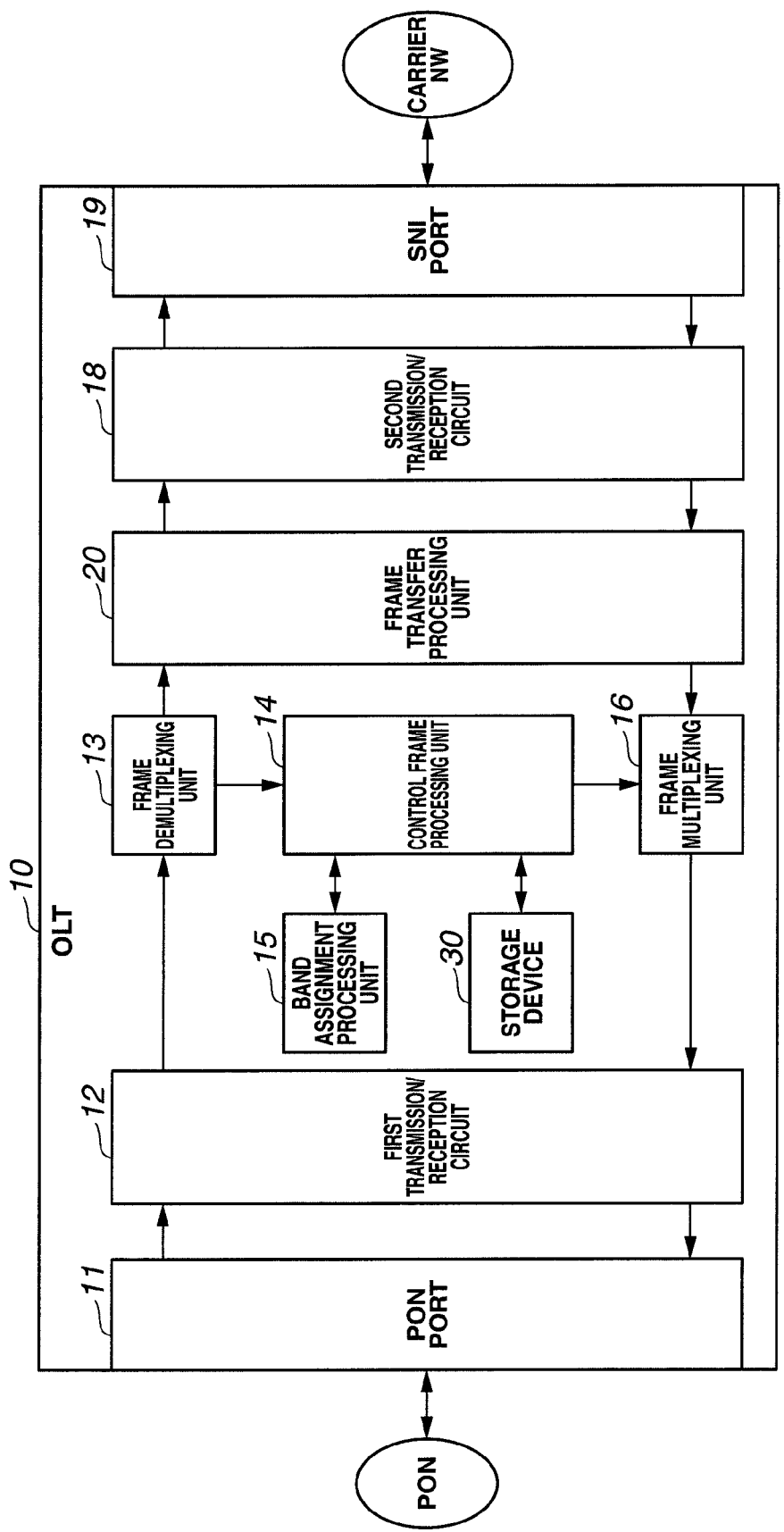
FIG. 2 is a block diagram showing the arrangement of an OLT according to the first embodiment.

Referring to FIG. 2, a first transmission/reception circuit 12 is a circuit that transmits/receives a frame to/from an ONU via a PON connected to a PON port 11.

A second transmission/reception circuit 18 is a circuit that serves as an interface to a carrier network NW connected via an SNI port 19.

The frame demultiplexing unit 13 demultiplexes, out of upstream frames input from the first transmission/reception circuit 12, a frame (control frame used to control the PON or control frame used for software processing) for the OLT and outputs it to the control frame processing unit 14, and also transmits the remaining frames to a frame transfer processing unit 20.

A frame multiplexing unit 16 is a processing unit that time-divisionally multiplexes a downstream frame from the frame transfer processing unit 20 and a control frame from the control frame processing unit 14 and transmits them to the first transmission/reception circuit 12.

The frame transfer processing unit 20 is a processing unit that transfers frames received from both the frame demultiplexing unit 13 and the second transmission/reception circuit 18 based on their destination MAC addresses and the like.

The control frame processing unit 14 is a processing unit that performs processes concerning PON control such as a discovery process for automatically assigning an LLID to each ONU and arbitration of an upstream signal (signal from an ONU to the OLT) and processing of transferring PON-IF port information such as the LLID of each ONU to a band assignment processing unit 15.

The band assignment processing unit 15 is a processing unit that performs assignment of a band (transmission start time and transmission data amount) to an ONU or management of PON-IF port information transferred from the control frame processing unit 14 in response to a request from the control frame processing unit 14.

The storage device 30 is a device that stores processing data as the target of software processing to be executed by a CPU provided outside or inside the OLT. The CPU analyzes a control frame such as an OAM frame, IGMP frame, or MLD frame saved in the storage device 30, and executes, as software processing corresponding to the analysis result, control processing of the local apparatus or processing of transferring the control frame directly or after rewrite of the contents to the carrier network NW or ONU side using a frame generation/transmission means (not shown) included in the frame transfer processing unit 20 or the like.

Operation of First Embodiment

Frame transfer processing of the OLT 10 according to this embodiment will be described next in detail with reference to FIGS. 3 to 6.

The frame demultiplexing unit 13 of the OLT 10 according to this embodiment will be described first with reference to FIG. 3.

A frame determination unit 13A compares the destination MAC address and the like of an upstream frame input from the first transmission/reception circuit 12 with a determination condition registered in a frame determination table 13B, thereby determining the transfer destination of the upstream frame.

As shown in FIG. 4, the presence/absence of additional conditions, input data position, bit position, determination comparison data, transfer destination, frame type ID, and entry enable/disable are registered in the frame determination table 13B shown in correspondence with each entry.

In the frame determination table 13B according to this embodiment, the item of frame type ID is added to each entry, as compared to the conventional frame determination table 53B shown in FIG. 15 described above.

In the frame determination table 13B, the presence/absence of additional conditions is information representing whether to perform determination in combination with the next entry. The input data position is information that designates the MAC address or the like to be used for determination. In this example, "0" designates the destination MAC address; "1", the transmission source MAC address; "2", 6-byte data immediately after the transmission source MAC address; and "3", 6-byte data immediately after "2".

The bit position is mask information that further designates bits to be used for determination out of the MAC address or the like designated by the input data position. The determination comparison data is data to be compared with the bits designated by the bit position. The transfer destination is information representing the transfer destination of the input frame based on the comparison result. In this example, "0" indicates the frame transfer processing unit 20; "1", a frame processing circuit 14B; and "2", the storage device 30. Entry enable/disable is information representing the enable/disable of the entry.

The frame type ID is a type ID assigned in advance to an upstream frame matching a determination condition of the entry. One frame type ID may be shared by a plurality of determination conditions. When counting the number of upstream frames for each LLID, the control frame processing unit 14 can count the number of frames only for upstream frames given a frame type ID designated in advance. This makes it possible to suppress write in the storage device 30 based on the number of frames of a specific type and exclude the number of frames of types that are not designated.

Hence, for example, when an upstream frame in which 2-byte data immediately after the transmission source MAC address has a value of 8808 in hexadecimal notation is input from the first transmission/reception circuit 12, the upstream frame matches the determination condition of address 0 in the frame determination table 13B. Hence, the transfer destination is "1", that is, the frame processing circuit 14B in the control frame processing unit 14 to be described later, and the frame type ID is "0". In the entry of address 0, bits that are 0 at the bit positions of input data to be used for determination indicate that the bits at those positions are not included in the comparison target, and the comparison target includes only the Type/Length value.

On the other hand, when an upstream frame in which the destination MAC address is "01-80-C2-00-00-02" in hexadecimal notation, and 2-byte data immediately after the transmission source MAC address has a value of "8809" in hexadecimal notation is input, the upstream frame matches the determination conditions of address 1 and address 2 in the frame determination table 13B. Hence, the upstream frame is confirmed to be not a data frame for the carrier network but a control frame for the OLT 10. The transfer destination is determined as "2", that is, the storage device 30, and the frame type ID is "2".

In the entry of address 1, the presence/absence of additional conditions is "present". This indicates that the transfer destination is determined not only by the determination condition of address 1 but in combination with the determination condition of the next address, in this case, address 2. Hence, in this example, if a frame matches only one of the determination conditions of address 1 and address 2, it is determined that not all the determination conditions are met.

If an upstream frame that does not match the determination condition of any address in the frame determination table 13B is input, the upstream frame is confirmed to be not a control frame for the OLT 10 but a data frame for the carrier network, and the transfer destination is determined to be the frame transfer processing unit 20.

Parallel to the upstream frame transfer destination determination processing of the frame determination unit 13A, a latency absorption unit 13C gives a delay corresponding to the time needed for the processing of the frame determination unit 13A to the upstream frame input from the first transmission/reception circuit 12, and outputs the upstream frame to a data giving unit 13D.

The data giving unit 13D gives the transfer destination and the frame type ID notified by the frame determination unit 13A to the preamble of the upstream frame from the latency absorption unit 13C, and outputs the upstream frame to an output destination selection unit 13E.

As shown in FIG. 4, the upstream frame output from the data giving unit 13D is different from the conventional frame arrangement shown in FIG. 15 described above in that the frame type ID is inserted into the preamble.

The output destination selection unit 13E outputs the upstream frame to the frame transfer processing unit 20 or the control frame processing unit 14 based on the transfer destination given to the preamble of the upstream frame from the data giving unit 13D. More specifically, in this example, when the transfer destination is "0", the upstream frame is output to the frame transfer processing unit 20. When the transfer destination is "1" or "2", the upstream frame is output to the control frame processing unit 14.

The control frame processing unit 14 of the OLT 10 according to this embodiment will be described next with reference to FIG. 6.

A transfer destination selection unit 14A transfers the upstream frame from the frame demultiplexing unit 13 to a frame processing circuit 14B or a write control unit 14F based on the transfer destination given to the preamble of the control frame.

The frame processing circuit 14B performs, based on the control frame from the transfer destination selection unit 14A, processes concerning PON control such as a discovery process for automatically assigning an LLID to each ONU and arbitration of an upstream signal (signal from an ONU to the OLT) and processing of transferring PON-IF port information such as the LLID of each ONU to the band assignment processing unit 15.

An individual counter 14D counts, out of control frames input from the frame demultiplexing unit 13, the number of control frames given an LLID and a frame type ID (a specific frame type is not always instructed, as will be described later) instructed by a counter control unit 14E in correspondence with each LLID of the control frames. Upon receiving a counter reset signal from the counter control unit 14E, the individual counter 14D resets (clears) the counter for each LLID.

The write control unit 14F compares the count result from the individual counter 14D with a threshold set by the counter control unit 14E for each LLID. If the count result is equal to or smaller than the threshold, the write control unit 14F determines that write is possible for a control frame having the LLID. When the count result has exceeded the threshold, the write control unit 14F determines that write is impossible for the count target control frame having the LLID. If the determination result represents that write is possible, the control frame having the instructed LLID is output to a data write unit 14C. If the determination result represents that write is impossible, the count target control frame having the instructed LLID is discarded without being output to the data write unit 14C.

The counter control unit 14E can instruct the individual counter 14D of one or a plurality of specific frame types associated with each LLID, which are externally set and input for each LLID, and instructs the write control unit 14F of the threshold externally set and input to be used for write enable/disable determination commonly or individually for the LLIDs. Note that the individual counter 14D may be instructed not to limit the count target by the frame type. In addition, a counter reset signal to reset (clear) the counter for each LLID is output to the individual counter 14D at a predetermined interval.

The data write amount when writing, in the storage device 30, data formed from some (control frames except frames to be transferred to the frame processing circuit 14B) or all (when transfer to the frame processing circuit 14B is not performed) of control frames input from the frame demultiplexing unit 13 is thus suppressed. At this time, the data write amount is suppressed for each of the LLIDs of the ONUs. The upper limit can also individually be set for each LLID. Counting is not performed for control frames of LLIDs or frame type IDs that are not set. The number of frames of LLIDs or frame types that are not designated is thus excluded.

Figure 3:
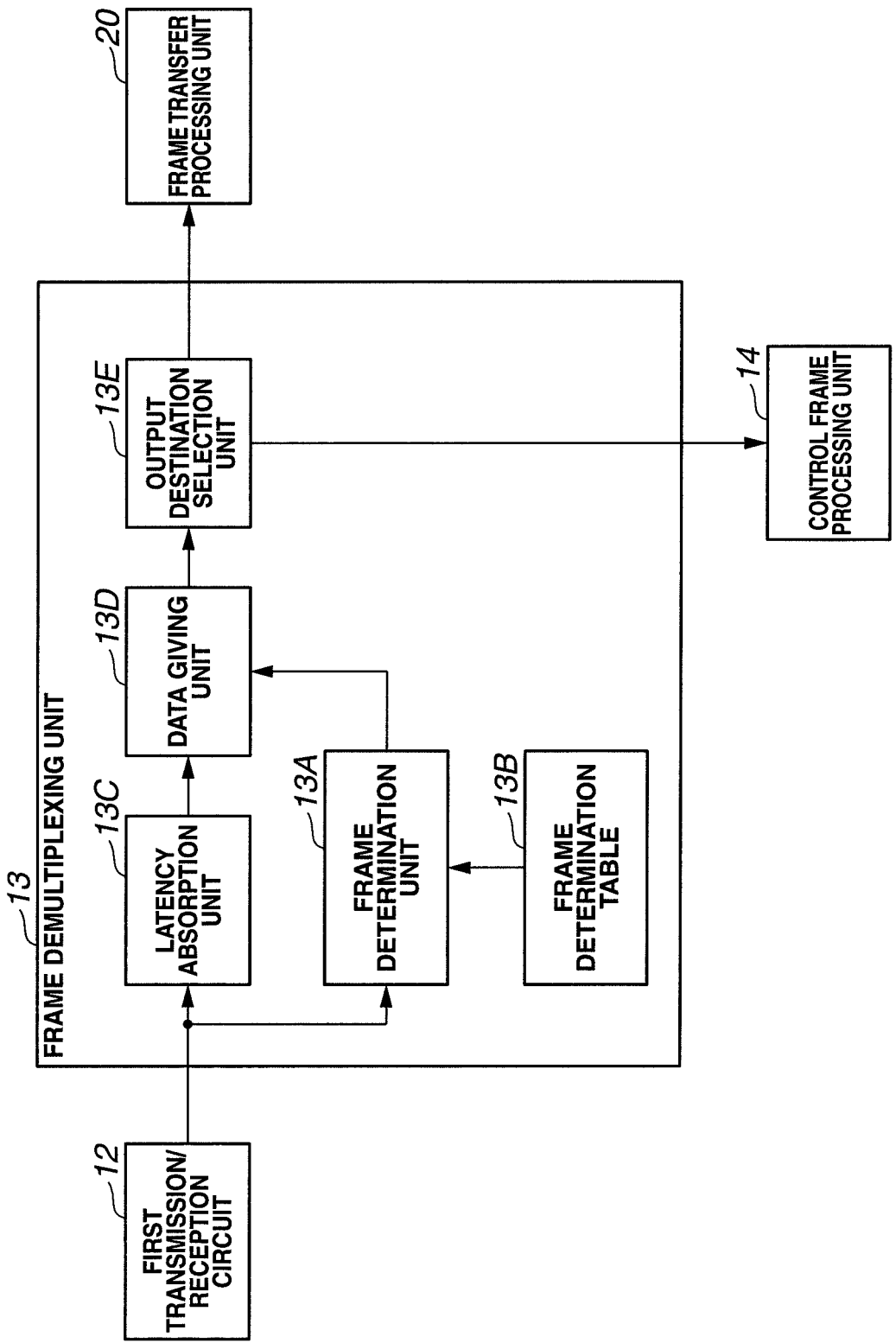
FIG. 3 is a block diagram showing the arrangement of a frame demultiplexing unit according to the first embodiment.
Figure 5:
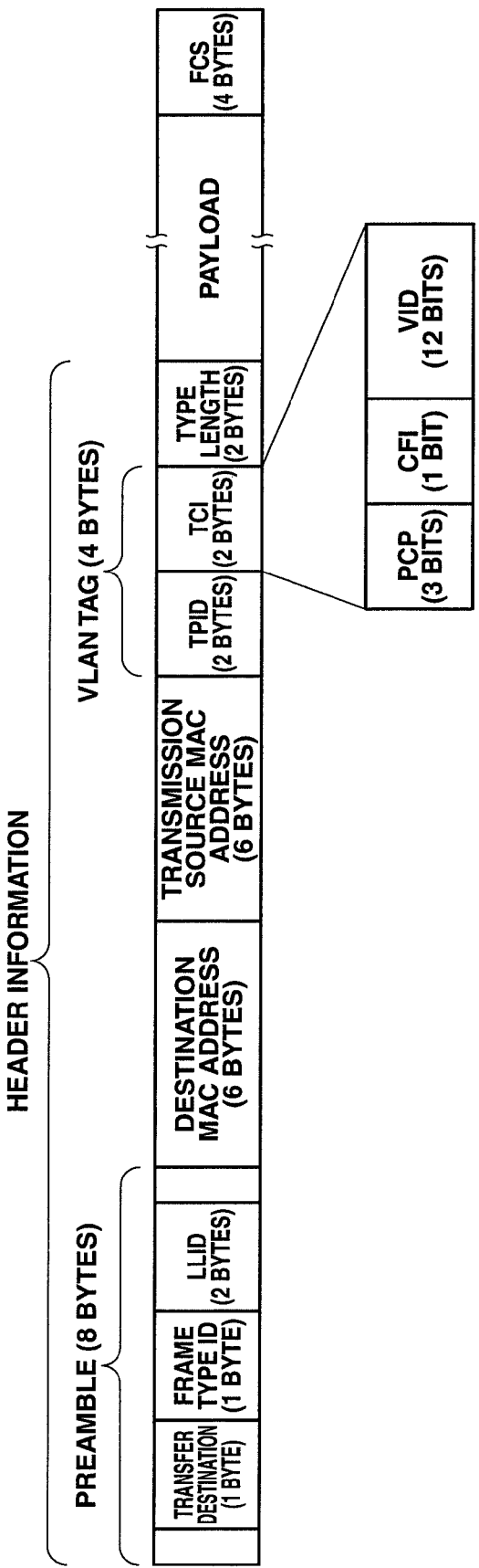
FIG. 5 is a view showing an example of the arrangement of an upstream frame output from a data giving unit.

Hence, for example, when an OAM frame whose frame type ID is "2" in FIG. 3 described above is set as the count target, the threshold for each LLID is set to "20", and the count period (reset cycle) of the individual counter 14D is set to 1 sec, the number of OAM frames to be written from the control frame processing unit 14 in the storage device 30 is 20 frame×number of LLIDs in use (under linkup) (equal to the number of ONUs under linkup) per sec at maximum.

When the upper limit of the number of LLIDs used in the OLT 10 (number of connected ONUs) is 32, the number of OAM frames to be written from the control frame processing unit 14 in the storage device 30 is 640 per sec at maximum. Hence, when a CPU capable of processing 640 frames/sec is used as a CPU provided outside or inside the OLT 10 to perform software processing such as OAM processing of the OAM frames, the state in which the software processing concerning the OAM frames delays does not occur even if the ONUs transmit more than 640 frames per sec. IGMP frames or MLD frames are transferred to the carrier network NW side by software processing of the CPU. The same effect as described above can be obtained from the above-described contents even for the IGMP frames and MLD frames.

Effects of First Embodiment

As described above, in this embodiment, the control frame processing unit 14 counts the number of control frames from the frame demultiplexing unit 13 for each LLID given to the control frames. If the number of frames during a predetermined count period is equal to or smaller than a preset threshold, some or all of the control frames are written in the storage device 30 as processing data. When the number of frames has exceeded the threshold, writing data of the count target control frames having the LLID in the storage device 30 is stopped.

This makes it possible to suppress the data write amount when writing, in the storage device 30, data formed from some or all of control frames input from the frame demultiplexing unit 13.

This can avoid a situation in which processing load on software for processing data in the storage device 30 increases, and processing delays because of an increase in the amount of data written in the storage device 30. For this reason, even when the number of control frames from the ONUs increases, software processing can be executed properly.

In this embodiment, the control frame processing unit 14 counts the number of control frames for each of the LLIDs of the ONUs, and stops writing the count target control frames having the LLID in accordance with the count result. Hence, when the number of control frames from a specific ONU increases, the write can individually be stopped only for the count target control frames from the ONU. Since the control frames from the other ONUs are written in the storage device 30, the influence on the other ONUs can be suppressed.

The individual counter 14D does not count control frames of LLIDs or frame type IDs that are not set as the count target. This makes it possible to exclude the number of frames of LLIDs or frame types that are not designated and avoid unnecessary write suppression for the storage device 30.

In this embodiment, the counter control unit 14E can instruct the individual counter 14D of one or a plurality of specific frame types associated with each LLID, which are externally set and input for each LLID, and instructs the write control unit 14F of the threshold externally set and input commonly or individually for the LLIDs. It is therefore possible to adjust write control of control frames to optimum control contents in accordance with a communication form unique to each ONU.

Second Embodiment

An OLT according to the second embodiment of the present invention will be described next.

In the first embodiment, a case has been exemplified in which when the frame demultiplexing unit 13 determines the transfer destination of an upstream frame, one of the control frame processing unit 14 and the frame transfer processing unit 20 is selected.

In the second embodiment, a case will be described in which an upstream frame is transferred to both a control frame processing unit 14 and a frame transfer processing unit 20.

In this embodiment, a frame demultiplexing unit 13 determines a total of three types of upstream frame transfer destinations, one of the control frame processing unit 14 and the frame transfer processing unit 20 and both of them.

More specifically, in a frame determination table 13B shown in FIG. 3 described above, the transfer destination of each entry is set such that "0" indicates only the frame transfer processing unit 20; "1", only a frame processing circuit 14B; "2", only a storage device 30: and "3", both the frame transfer processing unit 20 and the storage device 30.

This makes it possible to output, out of upstream frames, an upstream frame that matches a predetermined determination condition to both the frame transfer processing unit 20 and the storage device 30.

Note that in the frame determination table 13B shown in FIG. 3 described above, the frame type ID is set as one independent item. However, each address of the frame determination table 13B may be used as a frame type ID, instead of preparing the area of frame type IDs.

At this time, for an MPCP frame, since the matching address is "0", the address "0" is used as the frame type ID. An OAM frame matches both address 1 and address 2. The address 2 for which the indication of the presence/absence of additional conditions is "absent" is used as the frame type ID.

Third Embodiment

An OLT according to the third embodiment of the present invention will be described next with reference to FIGS. 7 to 9.

In the first embodiment, an example has been described in which the control frame to be discarded is an OAM frame. In the third embodiment, a case in which the control frame to be discarded is an IGMP frame or MLD frame will be explained.

Figure 6:
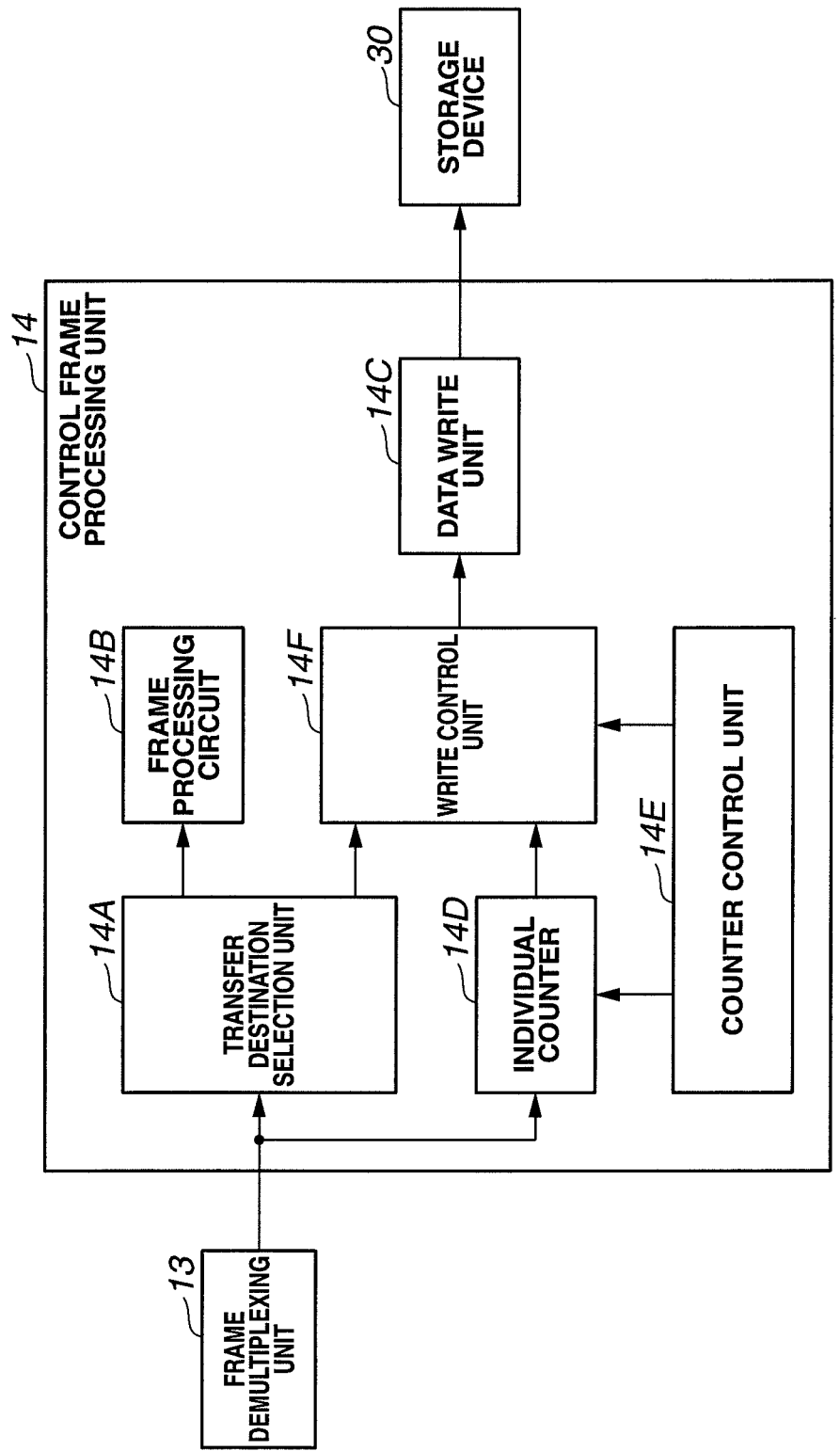
FIG. 6 is a block diagram showing the arrangement of a control frame processing unit.

The arrangement of the OLT according to this embodiment is the same as in FIGS. 2 and 6 described above except the contents of a frame determination table 133 in a frame demultiplexing unit 13.

To set the IGMP frame or MLD frame as the discarding target, the IP header is discriminated when determining a frame. Only when the frame is an IGMP frame or MLD frame, it is discarded (counted).

More specifically, as shown in FIG. 7, the input data position in the frame determination table 13B is extended to positions including the IP header and IPv6 header. As for the value of the input data position, "0" designates the destination MAC address; "1", the transmission source MAC address; "2", 6-byte data immediately after the transmission source MAC address; "3", 6-byte data immediately after "2"; "4", 6-byte data immediately after "3"; "5", 6-byte data immediately after "4"; "6", 6-byte data immediately after "5"; "7", 6-byte data immediately after "6"; "8", 6-byte data immediately after "7"; and "9", 6-byte data immediately after "8".

Determination of an IGMP frame will be described first. As shown in FIG. 8, the IGMP frame stores a message concerning IGMP in Payload located immediately after Type/Length of the upstream frame arrangement shown in FIG. 5. Version (4 bits) located at the start of Payload is information representing the version number of the Internet protocol used in this frame. Protocol (1 byte) located at the 10th byte from the start of Payload is a number to identify the header (TCP or UDP of the transport layer) of the host protocol used in this frame.

Figure 8:
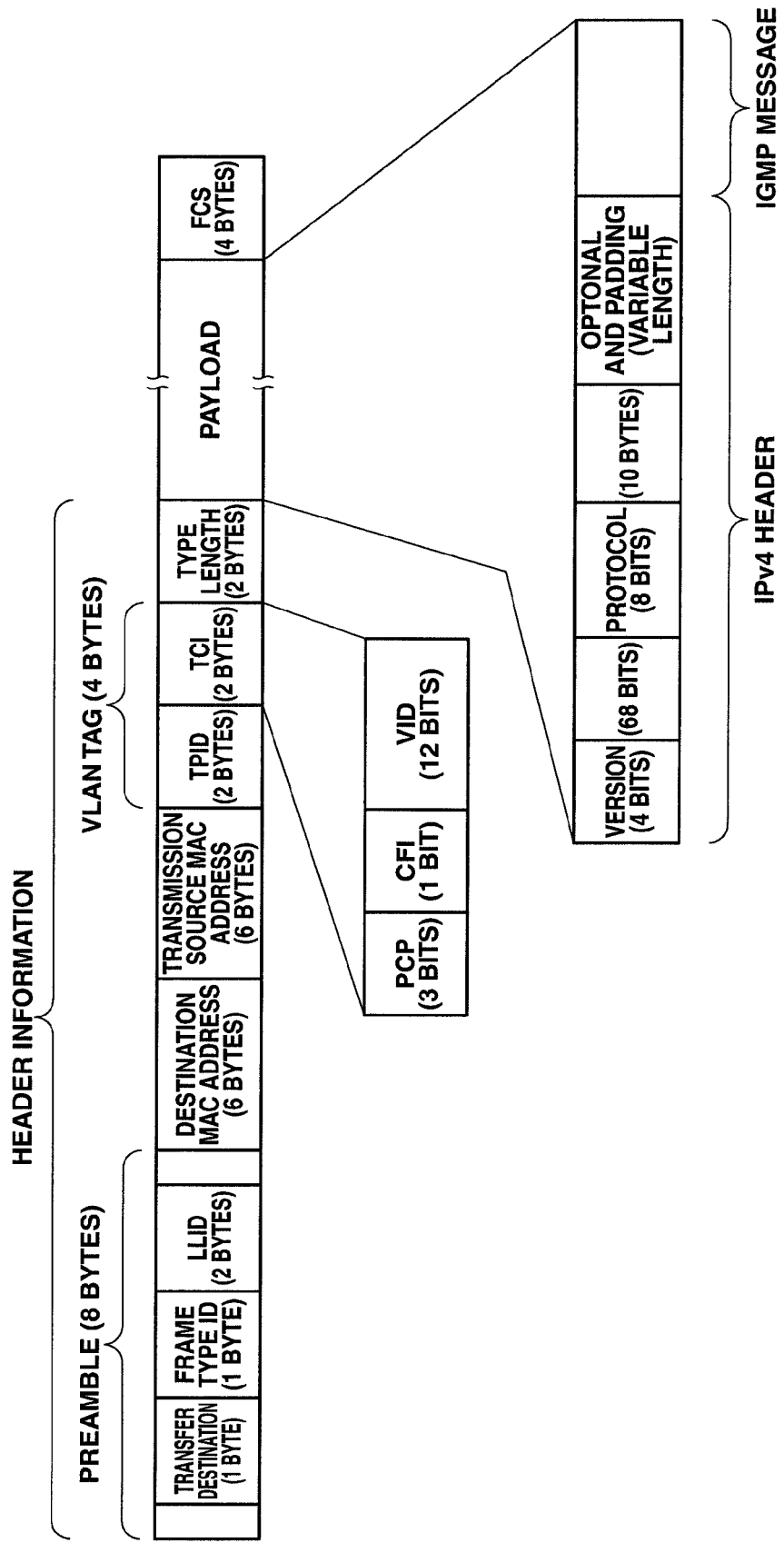
FIG. 8 is a view showing an example of the arrangement of an IGMP frame.

In the IGMP frame, various kinds of information stored in the frame shown in FIG. 8 include Type=0x0800 (IPv4), Version=0x4 (IPv4), and Protocol=0x2 (IGMP).

On the other hand, as registered in the frame determination table 13B shown in FIG. 7, when the pieces of information corresponding to Type, Version, and Protocol designated by the input data positions and bit positions in entry addresses 1 to 3 are "0x0800", "0x4", and "0x02", the transfer destination is "2", that is, the storage device 30 (the example shown in FIG. 7 assumes a case in which no VLAN tag is added to the IGMP frame).

For this reason, upon receiving an IGMP frame having such information from a first transmission/reception circuit 12, the frame determination unit 13A of the frame demultiplexing unit 13 determines that the transfer destination of the IGMP frame is "2", that is, the storage device 30, and determines the frame type ID as "2" because the IGMP frame matches the determination conditions registered in entry addresses 1 to 3 of the frame determination table 13B.

The IGMP frame is thus transferred from the frame demultiplexing unit 13 to a control frame processing unit 14, which determines, for each frame having the frame type ID "2" as the count target, whether the frame needs to be discarded or not based on the number of frames received during a predetermined count period, like the above-described OAM frame. If the frame need not be discarded, it is written in the storage device 30. If the frame needs to be discarded, write in the storage device 30 is stopped, and the frame is discarded.

Determination of an MLD frame will be described next. As shown in FIG. 9, the MLD frame stores a message concerning MLD in Payload located immediately after Type/Length of the upstream frame arrangement shown in FIG. 5. Version (4 bits) located at the start of Payload is information representing the version number of the Internet protocol used in this frame. Next Header (1 byte) for IP header located at the seventh byte from the start of Payload is information representing a number to identify the header (TCP or UDP of the transport layer) of the host protocol or IPv6 extension header (hop-by-hop option header or routing header) used in this frame. IPv6 extension header is used to store header information of low use frequency in IPv4, and arranged after the IPv6 header as needed (the IPv6 extension header may be absent, or a plurality of headers may be concatenated). In the example shown in FIG. 9, one IPv6 extension header exists after the IPv6 header, and an ICMPv6 (MLD) message follows. Next Header (1 byte) for option header located at the 41st byte from the start of Payload is information representing a number to identify the header of the host protocol or IPv6 extension header located immediately after the IPv6 extension header.

Figure 9:
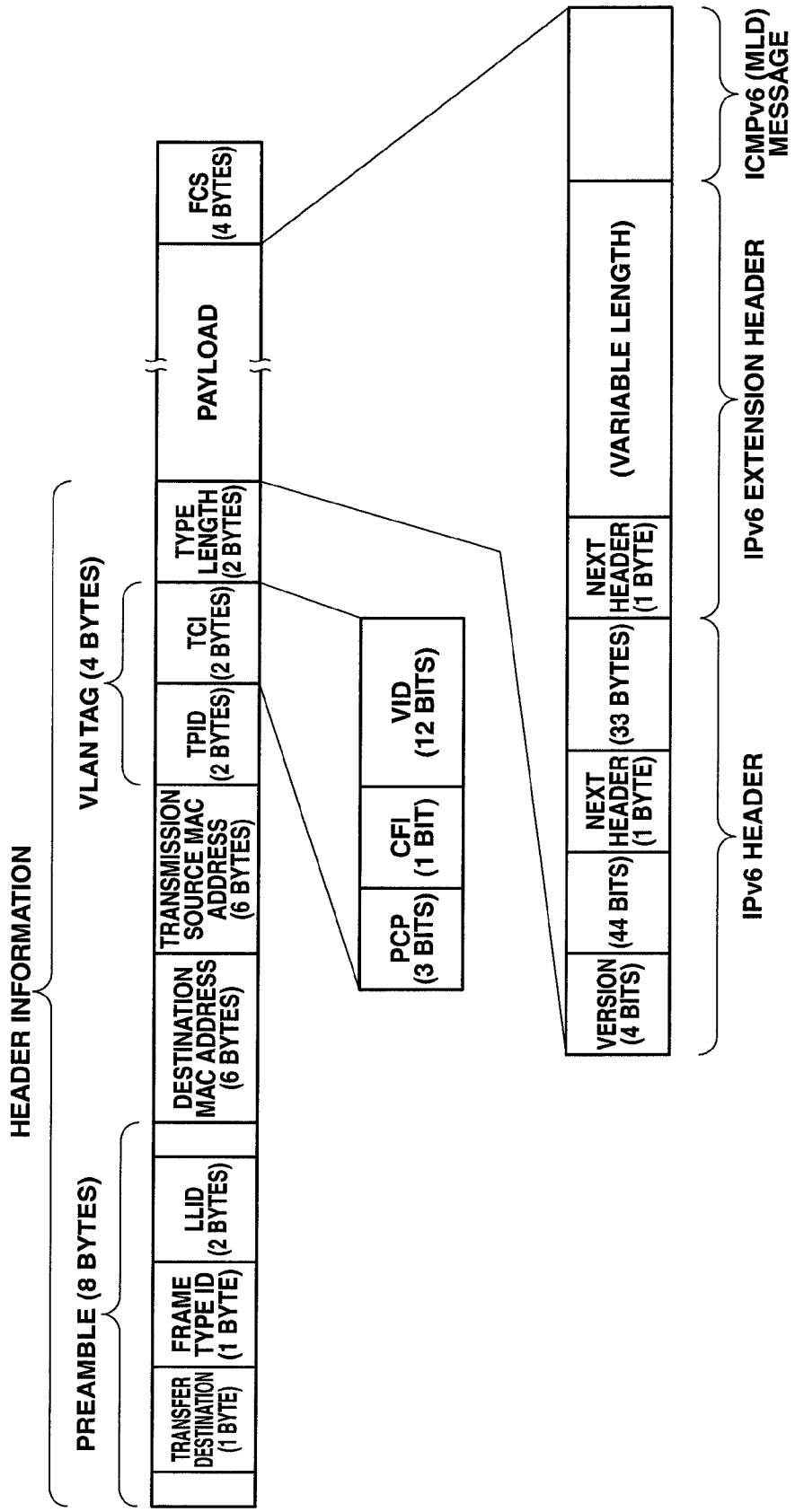
FIG. 9 is a view showing an example of the arrangement of an MLD frame.
Figure 10:
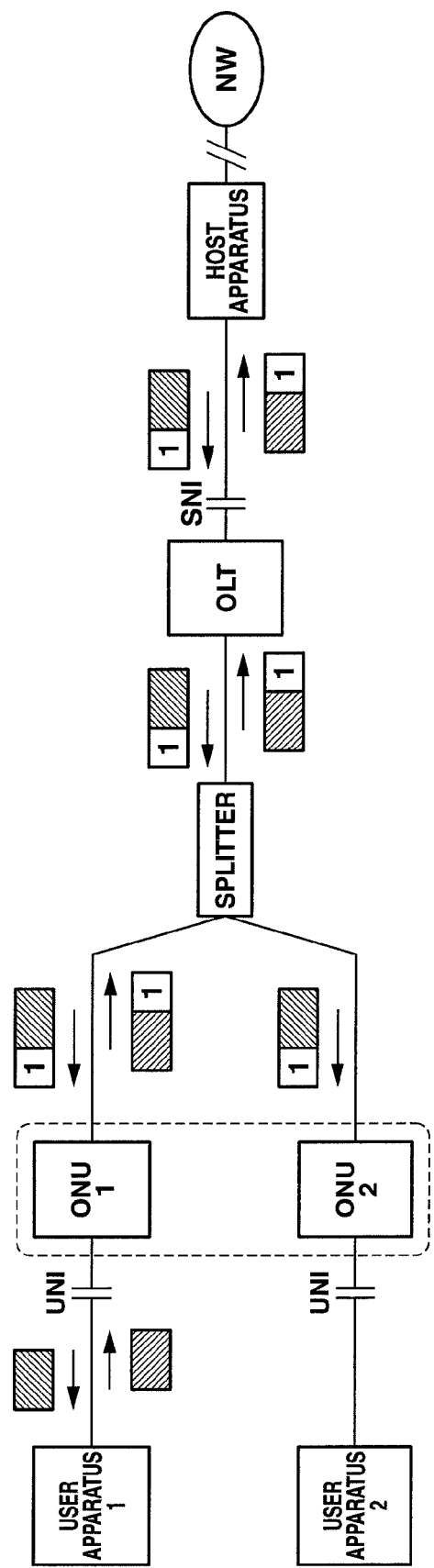
FIG. 10 is a view showing an example of the arrangement of a conventional PON system.
Figure 11:
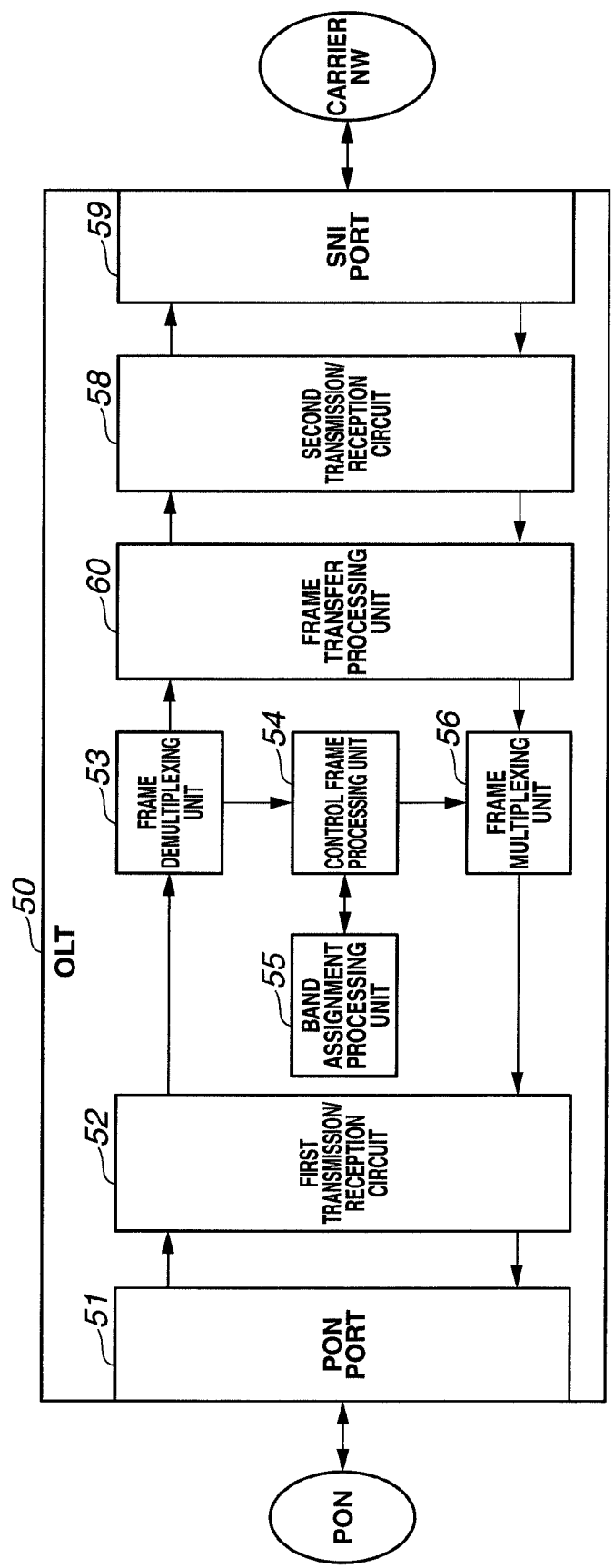
FIG. 11 is a block diagram showing the arrangement of a conventional OLT.
Figure 12:
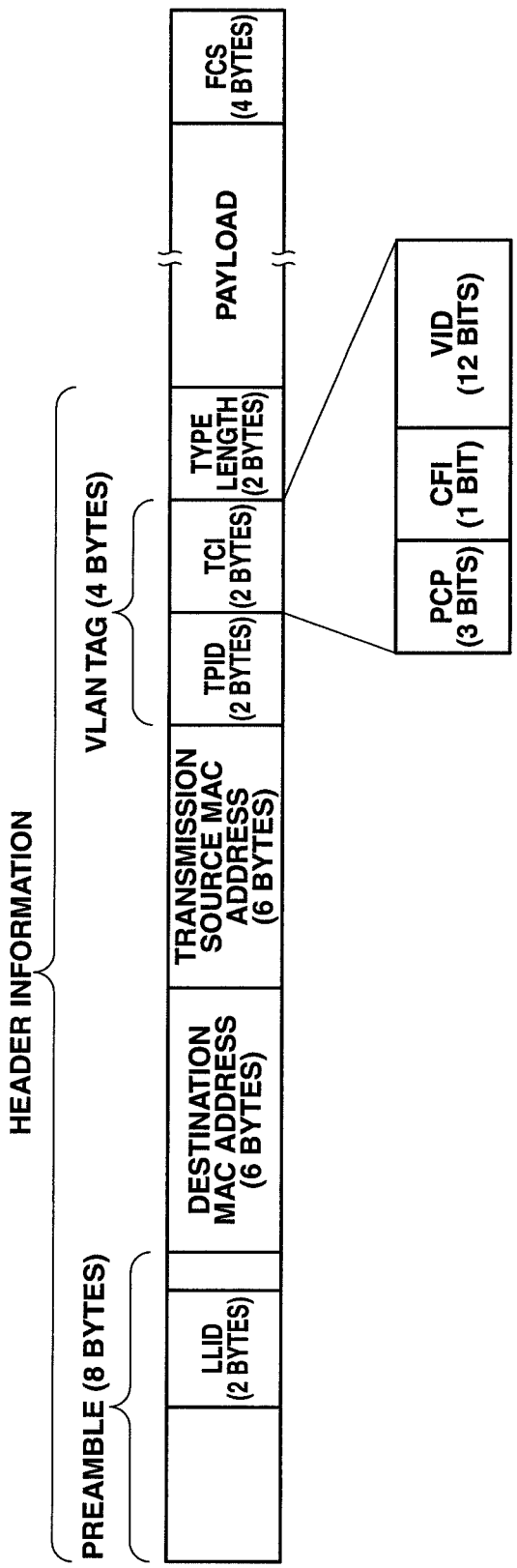
FIG. 12 is a view showing an example of the arrangement of a frame transmitted in a conventional PON section.
Figure 13:
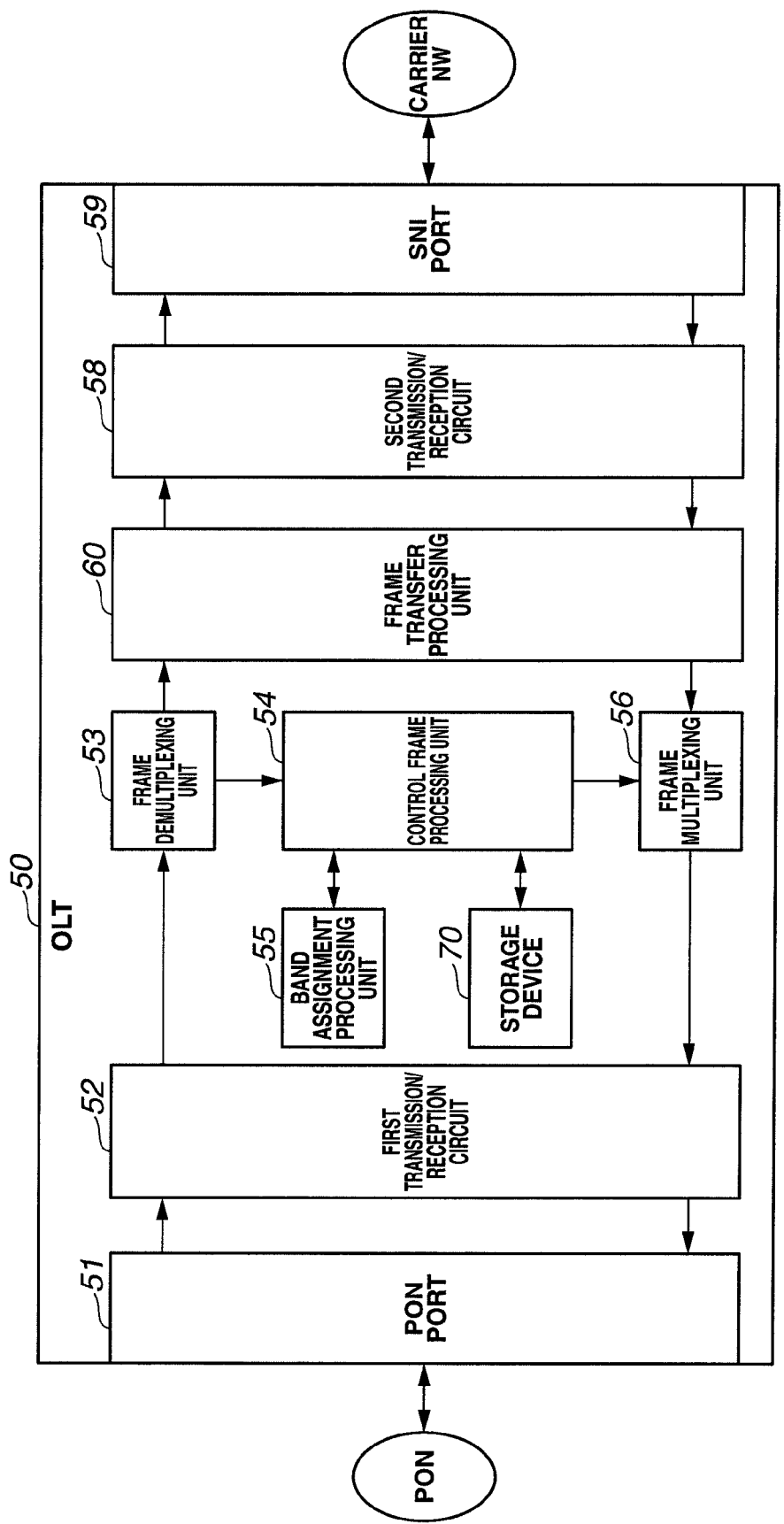
FIG. 13 is a block diagram showing another arrangement of the conventional OLT.
Figure 14:
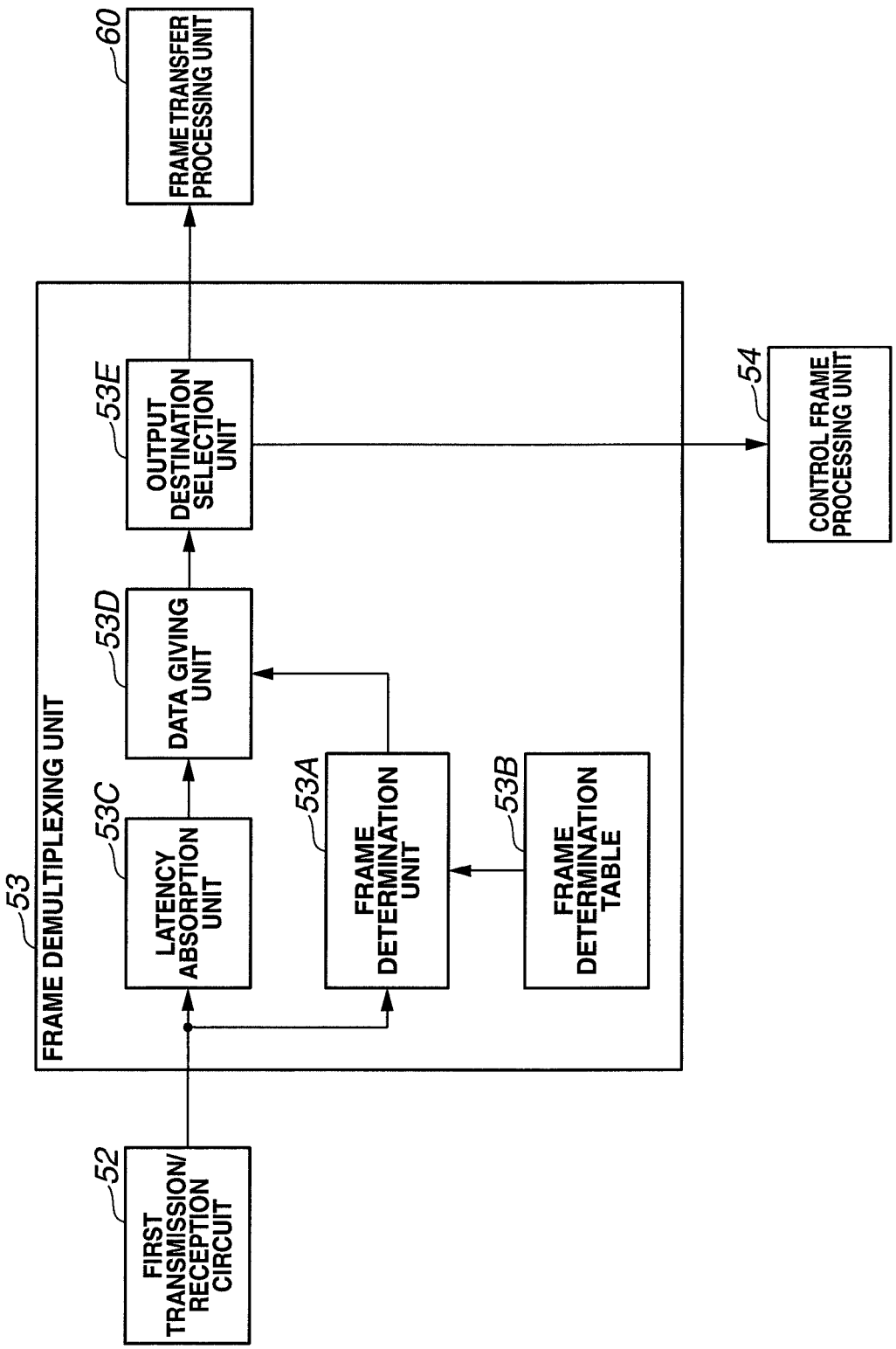
FIG. 14 is a block diagram showing the arrangement of a conventional frame demultiplexing unit.
Figure 16:
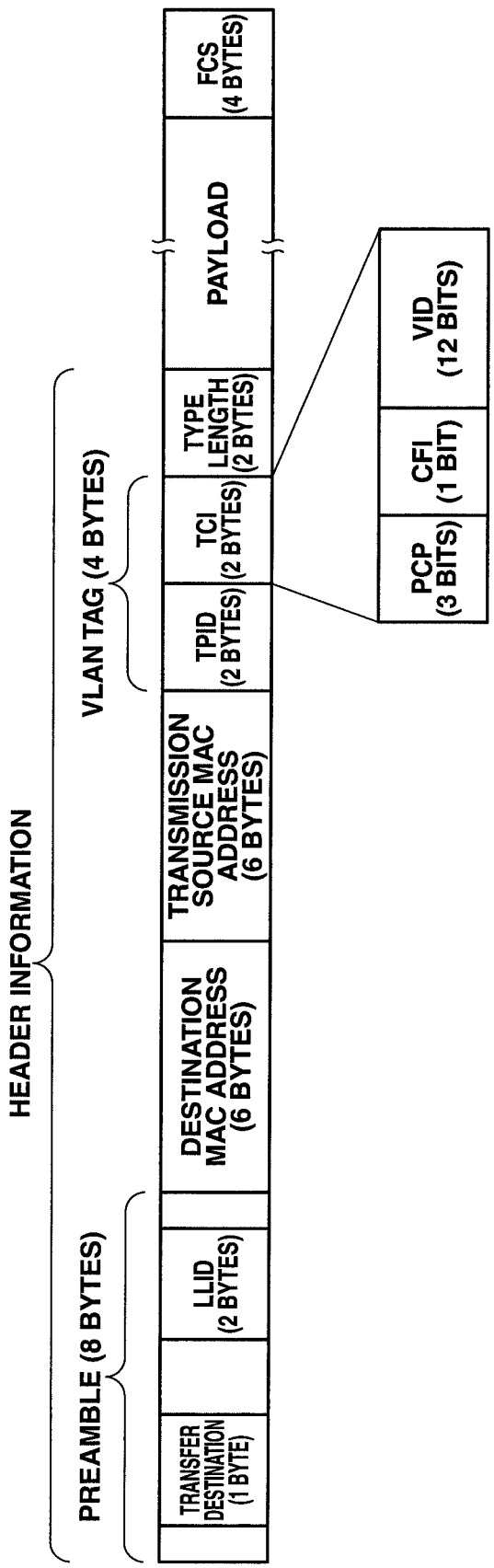
FIG. 16 is a view showing an example of the arrangement of an upstream frame output from a conventional data giving unit.
Figure 17:
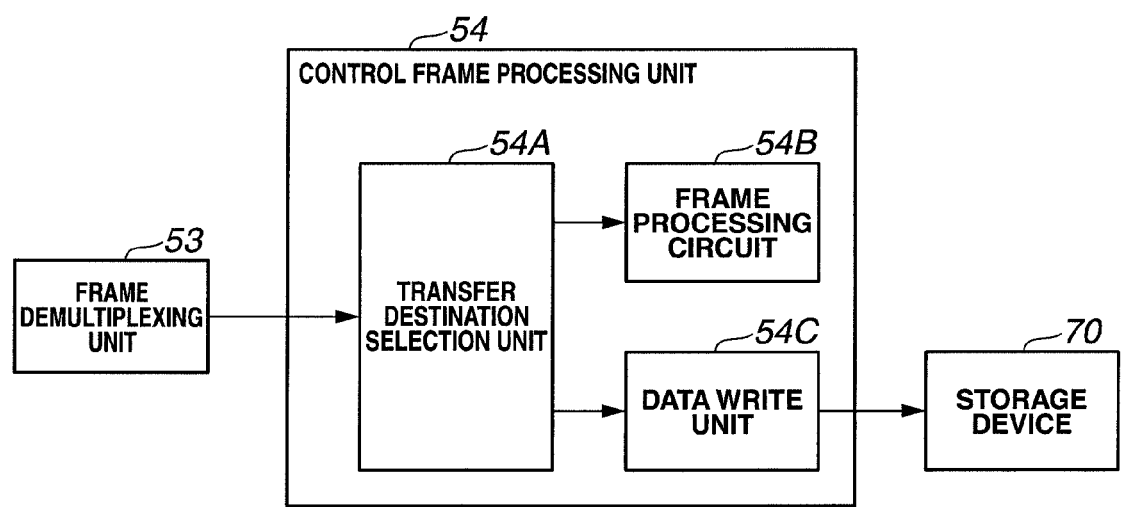
FIG. 17 is a block diagram showing the arrangement of a conventional control frame processing unit.

In an MLD frame including one hop-by-hop option header as an IPv6 extension header, various kinds of information stored in the frame shown in FIG. 9 include Type=0x86DD (IPv6), Version=0x6 (IPv6), Next Header for IP header=0x00 (HOPOPT: IPv6 Hop-by-Hop Option), and Next Header for option header=0x3A (ICMPv6) (MLD is the sub-protocol of ICMPv6).

On the other hand, as registered in the frame determination table 13B shown in FIG. 7, when the pieces of information corresponding to Type, Version, Next Header for IP header, and Next Header for option header designated by the input data positions and bit positions in entry addresses 4 to 7 are "0x86DD", "0x6", "0x00", and "0x3A", the transfer destination is "2", that is, the storage device 30 (the example shown in FIG. 7 assumes a case in which no VLAN tag is added to the MLD frame).

Similarly, in an MLD frame without an IPv6 extension header, various kinds of information stored in the frame shown in FIG. 9 include Type=0x86DD (IPv6), Version=0x6 (IPv6), and Next Header for IP header=0x3A (ICMPv6).

On the other hand, as registered in the frame determination table 13B shown in FIG. 7, when the pieces of information corresponding to Type, Version, and Next Header for IP header designated by the input data positions and bit positions in entry addresses 8 to 10 are "0x86DD", "0x6", and "0x3A", the transfer destination is "2", that is, the storage device 30 (the example shown in FIG. 7 assumes a case in which no VLAN tag is added to the MLD frame).

For this reason, upon receiving an MLD frame having such information from the first transmission/reception circuit 12, the frame determination unit 13A of the frame demultiplexing unit 13 determines that the transfer destination of the MLD frame is "2", that is, the storage device 30, and determines the frame type ID as "2" because the MLD frame matches the determination conditions registered in entry addresses 4 to 7 or entry addresses 8 to 10 of the frame determination table 13B.

The MLD frame is thus transferred from the frame demultiplexing unit 13 to the control frame processing unit 14, which determines, for each frame having the frame type ID "2" as the count target, whether the frame needs to be discarded or not based on the number of frames received during a predetermined count period, like the above-described OAM frame. If the frame need not be discarded, it is written in the storage device 30. If the frame needs to be discarded, write in the storage device 30 is stopped, and the frame is discarded.

Note that the frame type ID of the MLD frame may be determined as a value different from that of the IGMP frame, for example, "3", and both the frame types "2" and "3" may be set as the count target, that is, the discarding target.

Determination of an OAM frame will be described next. In the OAM frame, Type=0x8809 in the upstream frame arrangement shown in FIG. 5.

On the other hand, as registered in the frame determination table 13B shown in FIG. 7, when the information corresponding to Type designated by the input data position and bit position in entry address 0 is "0x8809", the transfer destination is "2", that is, the storage device 30.

For this reason, upon receiving an OAM frame having such information from the first transmission/reception circuit 12, the frame determination unit 13A of the frame demultiplexing unit 13 determines that the transfer destination of the OAM frame is "2", that is, the storage device 30, and determines the frame type ID as "0" because the OAM frame matches the determination conditions registered in entry address 0 of the frame determination table 13B.

The OAM frame is thus transferred from the frame demultiplexing unit 13 to the storage device 30. Since each frame having the frame type ID "0" is not set as the count target, the OAM frame can be excluded from the discarding target.

Effects of Third Embodiment

As described above, according to this embodiment, IGMP frames and MLD frames out of control frames included in upstream frames can be set as the discarding target only by changing the set contents of the frame determination table 13B. It is therefore possible to suppress the data write amount when writing data stored in the IGMP frame or MLD frame in the storage device 30.

This can avoid a situation in which processing load on software for processing data in the storage device 30 increases, and processing delays even if the number of IGMP frames or MLD frames from the ONUs increases. For this reason, even when the number of control frames from the ONUs increases, software processing can be executed properly.

Additionally, since the OAM frame can be excluded from the discarding target by making the corresponding frame type ID ineligible for count, only the IGMP frame or MLD frame can be set as the discarding target. This makes it possible to execute control processing based on the OAM frames even when the number of IGMP frames or MLD frames from the ONUs increases.

Note that a counter control unit 14E may individually output a counter reset signal for each counter on the LLID basis.

When a write control unit 14F includes a means for displaying whether the count value of each counter has exceeded the threshold on the LLID basis, load of software processing for control frames of an LLID for which the count value has exceeded the threshold can be reduced.

For example, before periodical counter reset by software, it is confirmed whether the count value of each counter has not exceeded the threshold. Only the counters of LLIDs whose count values have not exceeded the threshold are reset, and the counters of LLIDs whose count values have exceeded the threshold are not reset.

In such software processing, the counters of LLIDs whose count values have exceeded the threshold are not reset. Once the count value exceeds the threshold, all control frames as the count target of the LLID are discarded, and software processing for the discarded control frames is unnecessary.

Note that in another example, before periodical counter reset by software, it is confirmed whether the count value of each counter has not exceeded the threshold. The threshold is changed to 0 for LLIDs for which the count values have exceeded the threshold. For LLIDs for which the count values have not exceeded, the threshold is not changed, and the counters of all the LLIDs are cleared.

In such software processing, once the count value exceeds the threshold, the threshold for the LLID is changed to 0. Hence, all control frames as the count target of the LLID are discarded, and software processing for the discarded control frames is unnecessary.

Not only the OAM frame, IGMP frame, and MLD frame but also an EAP (Extensible Authentication Protocol) frame, a frame having another specific Type/Length value, and the like can be processed in a similar manner.

Extension of Embodiment

The present invention has been described above with reference to the embodiments. However, the present invention is not limited to the above embodiments. Various changes and modifications understandable by those who are skilled in the art can be done for the arrangements and details of the present invention. In addition, the embodiments can arbitrarily combined and implemented within a consistent range.

EXPLANATION OF THE REFERENCE NUMERALS AND SIGNS

100 . . . PON system, 10 . . . OLT, 11 . . . PON port, 12 . . . first transmission/reception circuit, 13 . . . frame demultiplexing unit, 13A . . . frame determination unit, 13B . . . frame determination table, 13C . . . latency absorption unit, 13D . . . data giving unit, 13E . . . output destination selection unit, 14 . . . control frame processing unit, 14A . . . transfer destination selection unit, 14B . . . frame processing circuit, 14C . . . data write unit, 14D . . . individual counter, 14E . . . counter control unit, 14F . . . write control unit, 15 . . . band assignment processing unit, 16 . . . frame multiplexing unit, 18 . . . second transmission/reception circuit, 19 . . . SNI port, 20 . . . frame transfer processing unit, 30 . . . storage device

The invention claimed is:

1. An Optical Line Terminal that is connected to a plurality of Optical Network Units via a Passive Optical Network and connected to a host apparatus via a Service Node Interface and mutually transfers a frame to be exchanged between the Optical Network Units and the host apparatus, comprising:
- a storage device that stores processing data as a target of software processing;
- a frame demultiplexing unit that demultiplexes and outputs one of a control frame to be used in the Passive Optical Network and a control frame to be used in the software processing from an upstream frame received from the Optical Network Unit via the Passive Optical Network; and
- a control frame processing unit that counts the number of control frames from said frame demultiplexing unit for each of individual Logical Link IDs of the Optical Network Units given to the control frames, if the number of frames during a predetermined count period is not more than a preset threshold, writes data formed from some or all of the control frames having the Logical Link ID in said storage device as the processing data, and when the number of frames has exceeded the threshold, stops writing data of the control frames having the Logical Link ID in said storage device,
- wherein said frame demultiplexing unit comprises:
- a frame determination unit that determines a transfer destination and a frame type of the upstream frame based on header information of the upstream frame;
- a data giving unit that gives the transfer destination and the frame type of the upstream frame determined by said frame determination unit to the upstream frame; and
- an output destination selection unit that transfers the upstream frame from said data giving unit to one of said control frame processing unit and a frame transfer processing unit based on the transfer destination given to the upstream frame, and
- said control frame processing unit comprises:
- an individual counter that counts, for each Logical Link ID given to the control frames, the number of control frames for which the frame type given to the control frames is a specific frame type out of the control frames from said frame demultiplexing unit; and
- a write control unit that controls for each Logical Link ID, write of the data of the control frames as a count target having the Logical Link ID in said storage device based on a comparison result between the threshold and a count result of said individual counter.

2. An Optical Line Terminal according to claim 1, wherein said control frame processing unit further comprises a counter control unit that instructs said individual counter of the specific frame type associated with the logical Link ID, which is externally set and input for each Logical Link ID, and instructs said write control unit of the threshold that is externally set and input commonly or individually for the Logical Link IDs.

3. An Optical Line Terminal according to claim 1, wherein said frame demultiplexing unit determines the transfer destination of the upstream frame based on one or a plurality of values of a Media Access Control address, a Type/Length value, a Virtual Local Area Network tag, and an Internet Protocol header included in the upstream frame.

4. A method for transferring a control frame used in an Optical Line Terminal that is connected to a plurality of Optical Network Units via a Passive Optical Network and connected to a host apparatus via an Service Node Interface and mutually transfers a frame to be exchanged between the Optical Network Units and the host apparatus, the method comprising:
- storing processing data as a target of software processing in a storage device;
- demultiplexing and outputting one of a control frame to be used in the Passive Optical Network and a control frame to be used in the software processing from an upstream frame received from the Optical Network Unit via the Passive Optical Network; and
- counting and processing the number of control frames from said demultiplexing and outputting for each of individual Logical link IDs of the Optical Network Units given to the control frames, if the number of frames during a predetermined count period is not more than a preset threshold, writing data formed from some or all of the control frames having the Logical Link ID in the storage device as the processing data, and when the number of frames has exceeded the threshold, stopping writing data of the control frames having the Logical Link ID in the storage device,
- wherein said demultiplexing and outputting comprises:
- determining a transfer destination and a frame type of the up stream frame based on header information of the upstream frame;
- giving the transfer destination and the frame type of the upstream frame determined by said determining to the upstream frame; and
- transferring the upstream frame from said giving to one of said control frame processing and a frame transfer processing based on the transfer destination given to the upstream frame, and
- said control frame counting and processing comprises:
- counting for each Logical Link ID given to the control frames, the number of control frames for which the frame type given to the control frames is a specific frame type out of the control frames from said frame demultiplexing; and
- controlling for each Logical Link ID, writing of the data of the control frames as a count target having the Logical Link ID in said storage device based on a comparison result between the threshold and a count result of said counting.

* * * * *

UNITED STATES PATENT AND TRADEMARK OFFICE
CERTIFICATE OF CORRECTION

| | |
|---|---|
| PATENT NO. | : 9,112,772 B2 |
| APPLICATION NO. | : 14/118889 |
| DATED | : August 18, 2015 |
| INVENTOR(S) | : Tomoaki Kawamura et al. |

Page 1 of 1

It is certified that error appears in the above-identified patent and that said Letters Patent is hereby corrected as shown below:

In The Claims,

Claim 2, line 55, delete "logical" and insert -- Logical --

Claim 4, line 26, delete "link" and insert -- Link --

Claim 4, line 37, delete "up stream" and insert -- upstream --

Signed and Sealed this
Fifteenth Day of March, 2016

Michelle K. Lee
*Director of the United States Patent and Trademark Office*